H. E. TIDMARSH.
BALL BEARING.
APPLICATION FILED MAY 3, 1918.
1,296,021.
Patented Mar. 4, 1919.
2 SHEETS—SHEET 1.
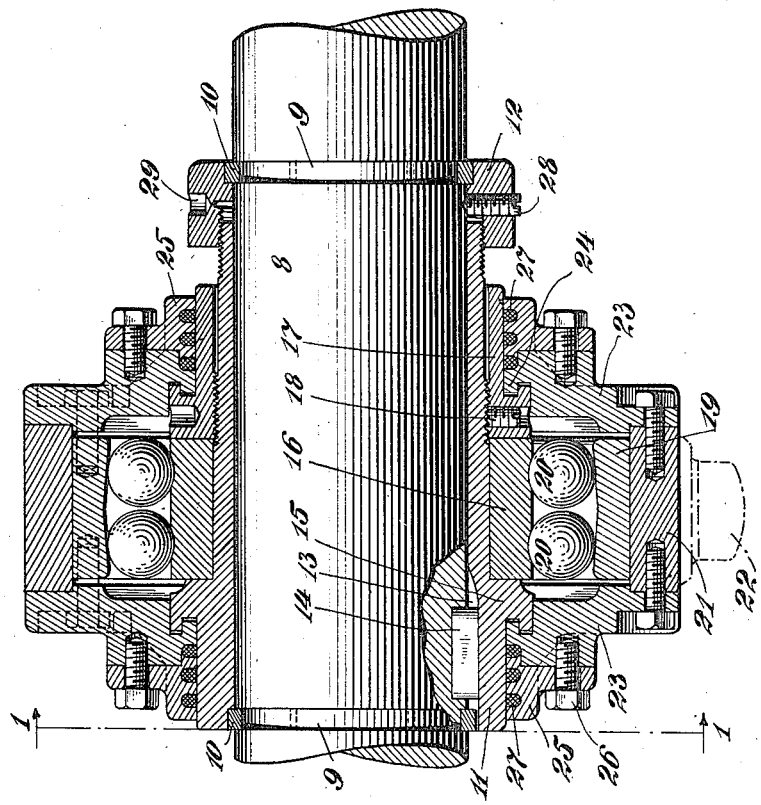
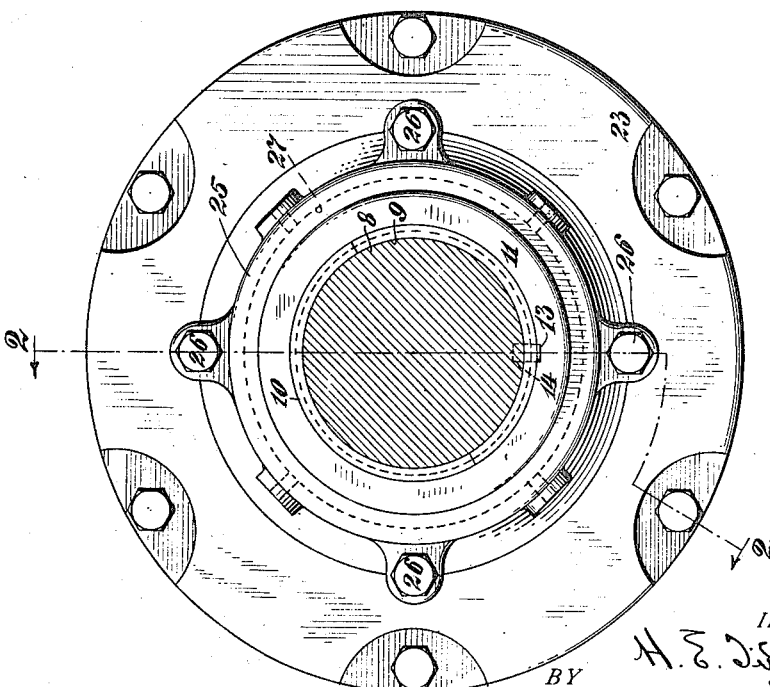
INVENTOR.
H. E. Tidmarsh
BY
ATTORNEYS H. E. TIDMARSH.
BALL BEARING.
APPLICATION FILED MAY 3, 1918.
1,296,021.
Patented Mar. 4, 1919.
2 SHEETS—SHEET 2.
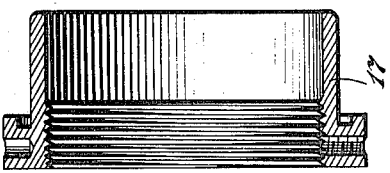
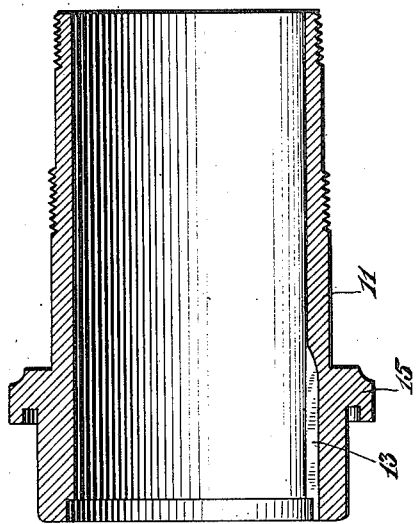
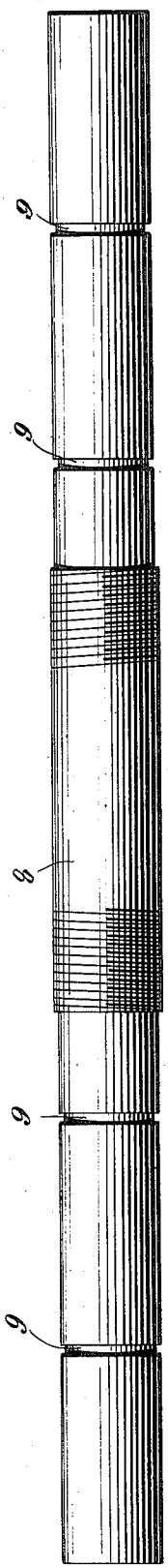
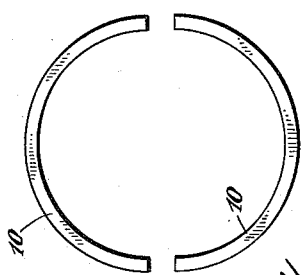
INVENTOR.
H. E. Tidmarsh
BY
ATTORNEYS

UNITED STATES PATENT OFFICE.

HARRY E. TIDMARSH, OF BANGOR, MAINE, ASSIGNOR OF ONE-HALF TO UNION IRON WORKS, A CORPORATION OF MAINE.

BALL-BEARING.

1,296,021.     Specification of Letters Patent.     Patented Mar. 4, 1919.

Application filed May 3, 1918. Serial No. 232,199.

*To all whom it may concern:*

Be it known that I, HARRY E. TIDMARSH, a citizen of the United States, residing at Bangor, in the county of Penobscot, State of Maine, have invented certain new and useful Improvements in Ball-Bearings; and I do hereby declare the following to be a full, clear, and exact description of the invention, such as will enable others skilled in the art to which it appertains to make and use the same.

This invention relates to ball bearings, particularly ball bearings for shafts which are required to withstand large lateral pressures. The invention is of special utility in ball bearings for the shafts of wood pulp grinders. These shafts are frequently as much as nine inches in diameter and when the grinders are in use, they are subjected to pressures running up into many tons, so much that it is impractical to make the shafts strong enough to avoid lateral deflection under the heavy pressures. Such deflection of a shaft under heavy pressure while it is rotating produces a tendency to cause relative movement of the shaft and its bearings in the direction of the length of the shaft. The present invention is directed to the provision of an improved construction for a ball bearing for such a shaft and particularly one in which provision is made for guarding against and in fact precluding any relative movement of the parts of the bearing relative to the shaft in the direction of the axis of the shaft.

In accordance with the invention, the shaft is provided with two circumferential grooves adapted to receive split rings and the parts of the ball bearing are located between these rings and are positioned by them by reason of the employment of coacting parts on the shaft which bear against the peripheries and the adjacent sides of the two split rings. The parts which bear against the split rings are preferably sleeves provided with coacting threads. This permits of placing the two sleeves upon the shaft with one of them inclosing and bearing against the corresponding ring, then placing the other ring in position, and then turning the two sleeves relatively so that their coacting threads cause them to move apart until the other sleeve is carried into hard engagement with its corresponding ring. In this way, the two sleeves may be fixed upon the shaft in such a way as to preclude any movement thereof axially upon the shaft except by turning them relatively on the shaft and such turning movement may be effectually guarded against by the employment of a set screw passing through the sleeve and engaging the shaft. The other parts of the ball bearing which rotate with the shaft, including the inner ball race, may be mounted upon these sleeves in position to coact with the stationary parts of the bearing.

The invention will be better understood by reference to the following description taken in connection with the accompanying drawings, which show the preferred embodiment of the invention. In these drawings, Figure 1 is a transverse section through the shaft showing the bearing in end elevation; Fig. 2 is a longitudinal section of the bearing; Fig. 3 is a view of the shaft; Fig. 4 is a view of one of the split rings; Fig. 5 is a longitudinal section of one of the sleeves; Fig. 6 is a longitudinal section of the sleeve nut; and Fig. 7 is a longitudinal section of the other sleeve.

Referring to these drawings, the shaft 8 is shown in Fig. 3 as having threads upon the middle portion thereof by which the grinder is mounted upon the shaft. In each end of the shaft are two circumferential grooves 9. Each of these grooves is adapted to receive a split ring such as that shown at 10 in Fig. 4. The grooves are relatively shallow so as not to weaken the shaft materially. I have found that a groove of a depth of one-quarter of an inch and a width of three-quarters of an inch is adequate in a structure including a shaft measuring nine inches in diameter.

The supporting structure for the rotating parts of the ball bearing consists of two sleeves 11 and 12 shown in Figs. 5 and 7. These two sleeves are provided with coacting threads and they lie between the two rings 10, each of the sleeves being provided with a circumferential recess at its end in which a ring 10 is received so that the sleeves inclose the rings and bear against the adjacent side walls of the rings. The sleeve 11 is provided with a longitudinal key-way 13 which receives a key 14 on the shaft 8. This sleeve is also provided with a circumferential flange 15, the side of which forms a wall against which the inner ball race 16 is held. This ball race fits tightly upon the sleeve 11 and it is held in position upon the sleeve by a sleeve nut 17 (Fig. 6) provided with internal threads adapted to engage external threads on the sleeve 11. When the ball race 16 has been mounted in position, the nut 17 is screwed up upon the sleeve into hard engagement with the race 16 and it is then held in position by a set screw 18 extending through a radial opening in the nut engaging the sleeve 11.

The outer ball race is shown at 19 and the balls 20 lie between the two races. The outer ball race 19 is carried by a ring 21 which is supported in position in any suitable manner, as by being provided with a bearing member 22 having a curved surface adapted to be received in a correspondingly shaped depression in a suitable pillow block. The sides of the ball race are closed by annular flanges 23 secured to the ring 21 and provided with flanges 24, corresponding to overlapping flanges on the flange 15 of sleeve 11 and a similarly shaped flange on the nut 17. Packing collars 25 are secured to the annular flanges 23 by bolts 26. These collars 25 have grooves on their interior surfaces in which suitable packing 27 is located, these packing rings being arranged to bear upon the surfaces of the sleeve 11 and nut 17 in the manner indicated in Fig. 2.

In assembling the parts thus constructed, the ring 10 with which the sleeve 11 coacts, is first placed in position in its groove 9 and the sleeve 11 is then moved along upon the shaft 8 until it incloses the ring 10 within the circumferential recess at the end of the sleeve. Certain of the parts, including the inner ball race 16 and nut 17 may be assembled upon the sleeve 11 before the latter is placed upon the shaft 8. The sleeve 12 is then moved along upon the shaft to cause its threads to engage the threads of the sleeve 11 and then the two sleeves are rotated relatively until the sleeve 12 is carried beyond the groove 9 in shaft 8 for the ring with which the sleeve 12 coacts. This ring is then placed in position in its groove 9. This having been done, the sleeve 12 is turned in the opposite direction upon the sleeve 11, moving it back in the direction of the axis of the sleeve until it incloses its ring 10 in the circumferential recess of the sleeve. The turning movement of sleeve 12 relative to sleeve 11 is continued until the two sleeves are carried into hard engagement with the adjacent faces of the two rings 10 projecting beyond the periphery of the shaft 8. The two sleeves having been located thus, they are locked to the shaft 8 so as to preclude rotational movement thereof relatively to the shaft. The key and key-way 14 and 13 serve to prevent relative rotation of sleeve 11 upon the shaft and rotation of sleeve 12 upon the shaft may be effectively guarded against by the provision of one or more set screws 28 threaded into radial openings in the sleeve 12. In addition to the radial openings for these set screws, the sleeve 12 may be provided with additional radial openings 29 to facilitate the application of a suitable tool to the sleeve for turning it upon the sleeve 11 to cause the desired hard engagement of the sleeves with the adjacent faces of the rings 10.

By this construction the parts of the ball bearing are definitely located with respect to the length of the shaft so that any relative movement of the bearing and the shaft in the direction of the length of the shaft is rendered impossible. The two rings 10 fit snugly in their grooves in the shaft and the supporting structure of the bearing is then extended in the direction of the length of the shaft until it is carried into hard engagement with the adjacent faces of these rings. The construction is therefore specially well adapted for use in bearings for the shaft of a wood pulp grinder wherein the shaft and bearings are subjected to very severe stresses resulting in continual lateral flexure of the shaft under the pressure with which the wood to be ground is forced into contact with the grinder carried by the shaft.

I claim:—

1. In a ball bearing, the combination of a shaft having two circumferential grooves therein, rings in the grooves, two sleeves on the shaft between the rings having threaded engagement with each other and each provided with a circumferential recess at its end in which the portion of one of the rings projecting beyond the surface of the shaft is received, a ball race mounted on one of the sleeves, a second ball race, balls between the two races, and means for supporting the outer ball race; substantially as described.

2. A ball bearing comprising the combination of a shaft having two circumferential grooves therein, rings in the two grooves projecting beyond the surface of the shaft, two sleeves on the shaft having threaded engagement with each other and each provided with a circumferential recess within which the portion of one of the rings projecting beyond the surface of the shaft is received, means for preventing rotation of the sleeves upon the shaft, a circumferential flange on one of the sleeves, a ball race on the sleeve abutting against the flange, a nut threaded on the sleeve and engaging the ball race, means for preventing rotation of the nut upon the sleeve, an outer ball race, balls between the races, and means for supporting the outer ball race; substantially as described.

3. In a ball bearing, the combination of a shaft having two circumferential grooves, rings located in the grooves and projecting beyond the surface of the shaft, a pair of threaded sleeves on the shaft between the two rings having threaded engagement with each other and each provided with a circumferential recess at its end within which the portion of a ring projecting beyond the surface of the shaft is received, means for preventing rotation of the sleeves upon the shaft, a flange on one of the sleeves, a ball race on said sleeve, a nut threaded on said sleeve for holding the race between it and the flange, an outer ball race, balls between the races, and annular members secured to the outer ball race, lying on opposite sides of the balls and coacting with parts rotating with the shaft; substantially as described.

In testimony whereof I affix my signature.

HARRY E. TIDMARSH.